United States Patent
Hansmann et al.

(10) Patent No.: US 6,965,988 B1
(45) Date of Patent: Nov. 15, 2005

(54) METHOD AND APPARATUS FOR THE USER-DEFINED LOADING AND RUNNING OF APPLICATIONS BY MEANS OF A TOKEN

(75) Inventors: Uwe Hansmann, Altdorf (DE); Horst Henn, Boeblingen (DE); Lothar Merk, Weil i. Sch (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 09/602,261

(22) Filed: Jun. 23, 2000

(30) Foreign Application Priority Data

Jun. 25, 1999 (DE) .............................. 199 29 049

(51) Int. Cl.$^7$ .......................................... G06F 15/177
(52) U.S. Cl. .......................... 713/1; 719/317; 709/202
(58) Field of Search ........ 717/168–178; 709/200–203; 719/310–320; 713/1, 2, 100

(56) References Cited

U.S. PATENT DOCUMENTS

| | | | |
|---|---|---|---|
| 5,521,362 A | * | 5/1996 | Powers ....................... 235/380 |
| 5,739,510 A | * | 4/1998 | Petit ........................... 235/380 |
| 5,784,463 A | * | 7/1998 | Chen et al. .................. 713/171 |
| 6,023,585 A | * | 2/2000 | Perlman et al. .............. 717/178 |
| 6,096,096 A | * | 8/2000 | Murphy et al. .............. 717/175 |
| 6,252,791 B1 | * | 6/2001 | Wallace et al. ............... 365/52 |
| 6,260,078 B1 | * | 7/2001 | Fowlow ...................... 709/332 |
| 6,385,729 B1 | * | 5/2002 | DiGiorgio et al. .......... 713/201 |
| 6,678,828 B1 | * | 1/2004 | Zhang et al. ............... 713/201 |

* cited by examiner

Primary Examiner—St. John Courtenay, III
(74) Attorney, Agent, or Firm—Louis P. Herzberg; Anne Vachon Dougherty

(57) ABSTRACT

A method and apparatus for the user-defining, configuring and starting of an application or software components to form an application by means of a token and in particular a chip card. Via the service identifiers stored in the chip card which represent applications or software components to form applications, the chip card user can install the desired application. The card agent accepts the request for an application, checks the register to see if the application is present and if it is not, makes a connection to communicate with the server in order to download the application to the user system.

31 Claims, 2 Drawing Sheets

METHOD AND APPARATUS FOR THE USER-DEFINED LOADING AND RUNNING OF APPLICATIONS BY MEANS OF A TOKEN

FIELD OF THE INVENTION

The present invention relates to a method and apparatus for the user-defined loading and running of applications by means of a token and in particular a chip-card.

BACKGROUND OF THE INVENTION

Secure access to computers, i.e. the secure identification of the user, is the basis for virtually all the security provisions made in operating systems. Today, access to a system is safeguarded by means of password protection. To safeguard access to a computer system by using a chip card, there are extensions which need to be made to the architecture of the computer system. Each user whose identity code is to be protected by a chip card requires his own chip card on which the functions required (e.g. the encryption algorithm) and the relevant data are entered. A special device is needed to communicate with the chip card. This device, which is called a PINpad, comprises a reader unit, a keypad and a display. It is normally available to the user as an extra device additional to the keyboard and main display screen. The way in which access protection by chip card is achieved is that an additional attribute can be specified for each identity code, namely whether access is now only to be possible by chip card and which users have access to the identity code in question. Within a computer there can be both identity codes which, as in the past, are safeguarded only by a password and identity codes which are safeguarded by a chip card as well.

Access to an identity code protected by a chip card is only permitted if the following conditions are met at the user interface:
- the user has successfully performed the logging-on procedure
- the user enters the correct PIN for the chip card
- the user is in possession of a chip card which matches the identity code in question.

The user logs on by entering a log-on string at the terminal. The computer is thus in a position to decide whether the identity code concerned is protected by a chip card or not. If it is, the user is asked to insert his chip card and enter the PIN via the PIN pad. The verification procedure then takes place.

Today there is a restriction on the widespread use of chip cards in that the systems used lay down rigid rules as to which applications can be run in what form with which chip cards. Only if the matching counterpart to the application is installed on the chip card, which could even happen by chance, can the client use his chip card with the system concerned. If this is not the case, the application is unable to communicate with the chip card.

However, from the user's point of view, it is precisely when he wishes to vary the systems he uses that it would be desirable for any given system and its applications to orientate itself automatically to the particular user and his chip card rather than the other way around. It would then be perfectly possible to carry about with one a personal system with a customised configuration consisting of a variety of individual applications.

In the case of chip cards, there are standardised identifying mechanisms for making correlations between applications on the card-reading station (off-card applications) and their counterparts on a chip card (on-card applications). These are laid down in standards EMV 96 and ISO 7816. However, the idea underlying all such mechanisms is that the presentation and operation of the overall application which is shown to the client will always be determined by the off-card application. The chip card simply provides data, such as account number, name, address, etc. for one or more different applications. Hence, an application on an automatic account-keeping machine would be presented in the same form to all its authorised users. The option of varying the presentation, such as by varying the language in which the directions to the user are shown for example, would have to be explicitly programmed into the off-card application in a fixed form. If nothing else, customers' preferences of this kind could be stored in permanent form as a notation in the bank's customer database or in a separate field on the card. The first however would not be possible if the customer belonged to some other bank and the second is a proprietary solution which could only be standardised for a few frequently chosen options (such as language) and for specific applications or sectors of commerce.

The object of the present invention is therefore to provide a method and apparatus which make the user of applications which are activated via a token independent of the local functionality of the input system.

SUMMARY OF THE INVENTION

These and other objects of the invention are realized by a method and apparatus for the user-defining configuring and starting of an application or software components to form an application by means of a token and in particular a chip card. Via the service identifiers stored in his chip card which represent applications or software components to form applications, the chip card user can install the desired application. The card agent accepts the request for an application, checks the register to see if the application is present and if it is not, makes a connection to communicate with the server in order to download the application to the user system.

BRIEF DESCRIPTION OF THE DRAWINGS

The present invention will now be described by reference to preferred embodiments thereof and by reference to the figures, in which.

DETAILED DESCRIPTION OF THE INVENTION

Figure 1:
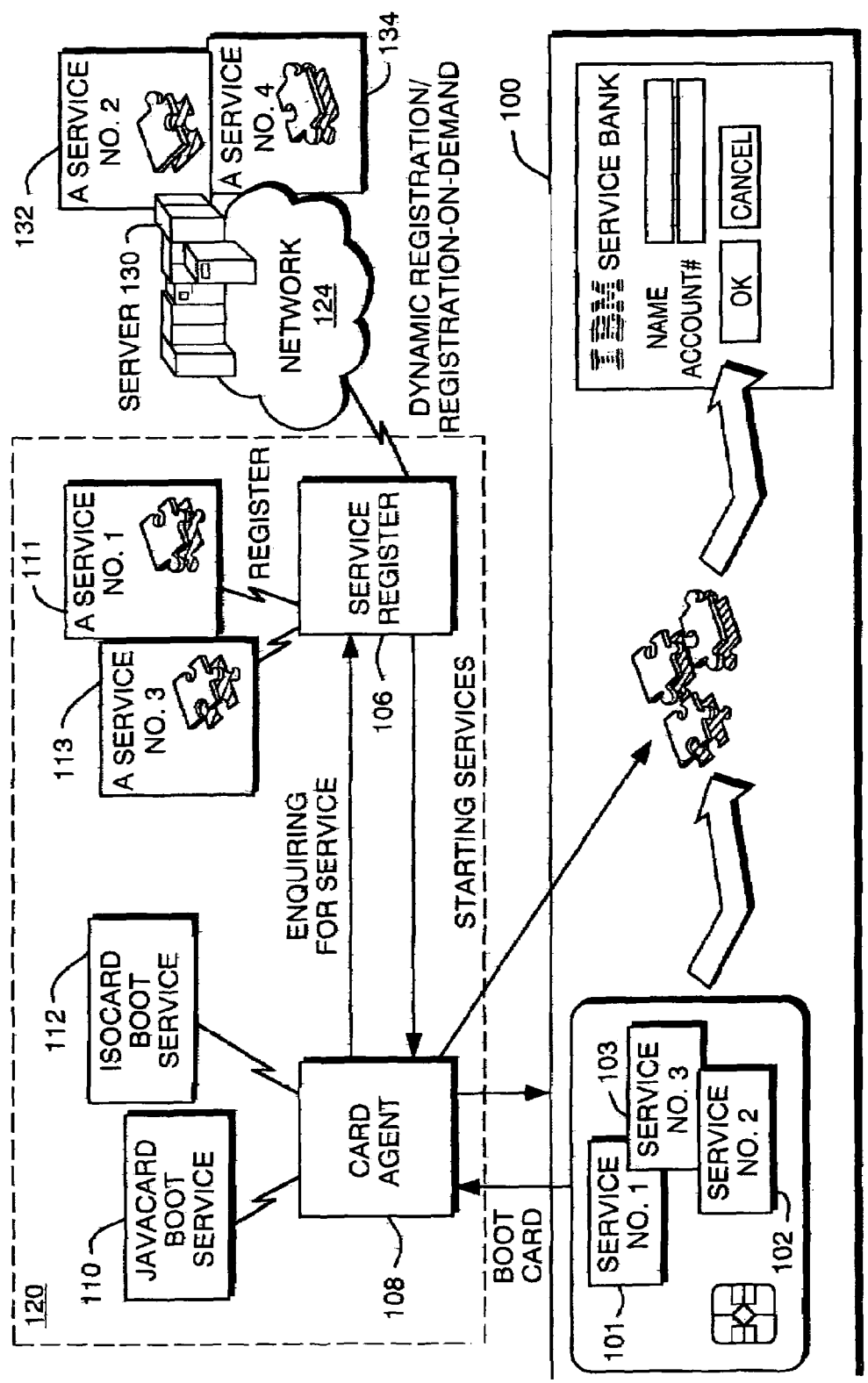
FIG. 1 shows the apparatus according to the invention.

FIG. 1 shows the inventive basic principle of the present invention. Unique identifiers (service identifiers) are stored on a chip card in a non-volatile memory. The service identifiers identify runnable applications, or runnable software components which can be combined to form an application. The storage of the service identifiers on the chip card can take place the first time a given application is called up and it will preferably be done automatically. In another embodiment, the chip card may be supplied with certain service identifiers already provided. The service identifiers may for example comprise numbers or strings of characters, such as a GUID (global unique ID) or a URL, which are stored on the chip card in a file. As well as this, the service identifiers may also include additional data relating to the application and the card-holder's preferences. The applications or software components form the link between the chip card and the user (the user interface of the application at the card-reader end) or other systems (databases, networks, etc.). They are preferably stored on the user system or on the system that the user regularly works with. In FIG. 1, service identifiers 101–103 are stored on the chip card. Software components 111 and 103 are stored on the user system 120 with which the chip card directly communicates. Also installed on this system are a card agent 108 and a register 106.

If the customer inserts the chip card 100 in a card reader belonging to the user system, the card agent 108, gives an APDU command to the chip card for it to communicate the application request and the minimum requirements of the application. The card agent has the appropriate drivers for the various card technologies (e.g. Mondex, (not shown) JavaCard 110 ISO 112) and having determined the card technology it loads the requisite driver. By referring to the communication (service identifier) from the chip card, the card agent checks whether the application or software component requested is available on the local user system and whether the card reader can meet the requirements of the application. The card agent retrieves the appropriate application or software component via the register. The register, which is implemented in the form of a file, table or database, manages all the available applications or software components which are offered on this specific user system/card reader. Where a certain software component is not available locally on the user system/card reader, there are two possibilities.

First, the desired software component can be loaded from a server 130 specified on the chip card. When this is the case, the service identifier will include the exact address of the server on which the desired software component is stored. If the card agent finds that the desired software component is not contained on the register, it makes a connection via the network 124 to the relevant server and downloads the desired software 132 or 134 component to the user system/card reader.

Alternatively, by referring to information relating to the software component which is stored on the chip card, the user system/card reader can decide whether it is able to offer similar or equivalent software components which meet the same specification.

In a further embodiment, the chip card may contain not only the service identifiers for the particular applications but also service identifiers for the card agent and the register. If the chip card user wishes to log on to some outside system on which neither the card agent nor the register is stored, he must first download the two modules which are stored on his user system to the system he currently wishes to work with. For this it is necessary for the service identifiers to contain the address information for these modules (e.g. URL's=Universal Resource Locations). The modules having been downloaded, the desired application is then run in the same way as was described in detail above.

In the case of an account-keeping application for example, various software components may be available which all use the same interface conforming to a predefined specification and which, where required, hold certain certificates. With the appropriate service identifier the chip card user can select a given account-keeping component. The suppliers of such software components may be the company bank or an independent software house. It is also possible for individually programmable software components to be offered (the swatch concept). Apart from different and personalised presentations at the user interface (e.g. language, positioning or clarity of layout), different software components can also implement slightly different applicational logic. For example, account-keeping tool A may sort transfers only by date whereas software component B may also allow them to be displayed arranged by amount. In another embodiment, a customer may combine various applications, such as the management of his account by his bank, his mobile telephone account with a telephone company and the booking of flights by a travel agent, into one overall application.

An off-card section on the chip card comprises service identifiers for the desired off-card applications (software components) and data conforming to the accustomed specifications such as SKA, GSM and IATA. The individual software components are combined in background without the user having to do anything. The chip card can call up the appropriate software components by using predefined interfaces. This transfer of responsibility is particularly helpful because the chip card itself knows which applications are stored on it and are immediately accessible to its holder.

Constructing the off-card application oneself in customised form would be considerably more complicated because this part of the application is only indirectly accessible to the user. Settings and variants would have to be individually programmed and settings would have to be stored separately in the background systems.

Apart from the greater flexibility obtained and the focus on the requirements of the customer, it is also possible in this way to implement plug-and-play mechanisms which enable any desired cards to be used at any desired reader stations.

Figure 2:
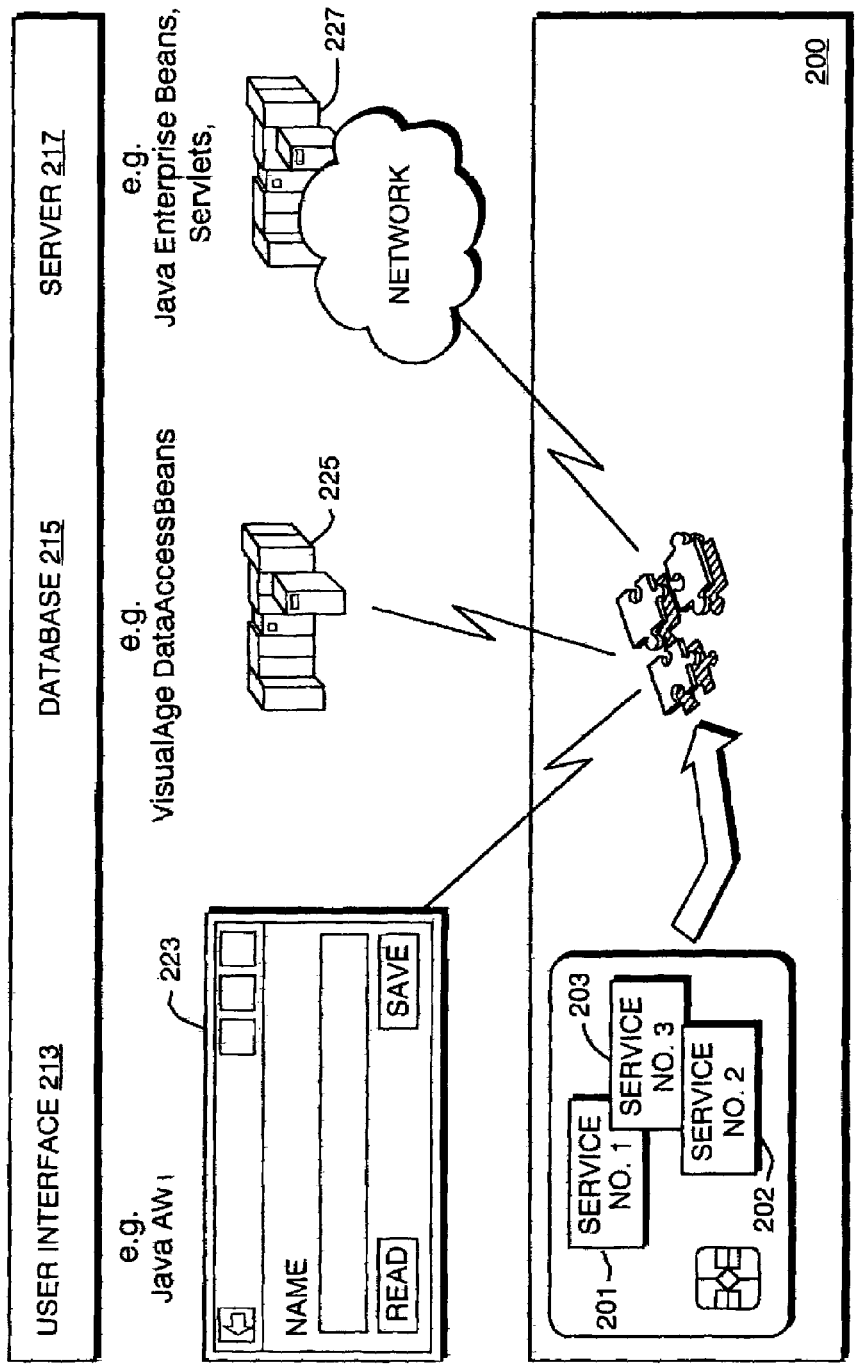
FIG. 2 shows the apparatus according to the invention in a JAVA environment.

FIG. 2 shows an actual implementation of the present invention in a JAVA environment. In this case there are three software components combined into one application. The first software component is a user interface 213 which has been produced by means of JAVA AWT 223 for example. The second component is formed by mechanisms for accessing a, database 215 using VisualAge Data Access Beans 225 and the third component 217 is used for accessing a server by means of Java Enterprise Beans or even servlets. Mechanisms for the worldwide allocation of identifiers are known (e.g. GUID, URL). The service identifiers for the present software components (services 201 –203) are situated on the chip card 200.

The idea on which the present invention is based is therefore to combine or configure the desired applications by means of a token and in particular a chip card. Via the service identifiers stored in his chip card which represent various applications or settings for applications, the chip card user can select the desired applications or settings and install them. The card agent accepts the request for an application, checks the register to see if the application is present and if it is not, makes a connection to communicate with the server in order to download the application to the user system.

What is claimed is:

1. Apparatus for the user-defined configuring of applications on a data-processing system by means of a token, comprising the following components:
    a) a token comprising a non-volatile memory for storing at least one unique identifying attribute, each unique identifying attribute being user-specific and being provided to call up at least one user-customized software comprising at least one of the application identified by the unique identifying attribute and software components to form said application, a volatile memory, and a microprocessor for processing data;

b) an apparatus for establishing communications between the token and a data-processing device; and
c) a data-processing device comprising at least one software comprising at least one of applications and software components to form an application, a register for registering the at least one software which is available on the data-processing device, and an agent for establishing communications between the token and the at least one software.

2. Apparatus according to claim 1, wherein the token is a chip card.

3. Apparatus according to claim 2, wherein the at least one identifying attribute allows the at least one software to be uniquely allocated to it.

4. Apparatus according to claim 3, wherein the identifying attribute includes address information for locating the software.

5. Apparatus according to claim 4, wherein the address information is provided in the form of a GUID and is stored in a file in the non-volatile memory of the chip card.

6. Apparatus according to claim 4, wherein the address information is shown in the form of a GUID and is stored in a file in the volatile memory of the chip card.

7. Apparatus according to claim 2, wherein the identifying attribute includes address information for locating the software and wherein the agent is a program that performs the following functions:
a) determining the card technology;
b) providing a driver associated with the card technology;
c) reading the address information on the card;
d) determining by reference to the address information whether the software is present on the data-processing device; and
e) establishing communications with at least one of a plurality of remote data-processing devices on which the software components are stored and downloading the latter to the data-processing device.

8. Apparatus according to claim 2, wherein the communication between chip card and agent takes place by means of APDU's.

9. Apparatus according to claim 1, wherein the token is a portable data-processing device.

10. Apparatus according to claim 9, wherein the portable data-processing device can take the form of at least one of a finger ring, an electrical plug, and a connector.

11. Apparatus according to claim 1, wherein the register is implemented in the form of at least one of a file, table and database on the data-processing device.

12. Apparatus according to claim 1, wherein the apparatus for establishing communication is implemented as at least one of a contactless-card reader and a contact-card reader.

13. Apparatus according to claim 1, wherein the agent is installed on a card reader.

14. Apparatus according to claim 1, wherein the agent is installed on the data-processing device.

15. Apparatus according to claim 1, wherein the agent is a program.

16. Apparatus according to claim 1, wherein the communication between token and agent takes place using the protocol for the particular token.

17. Method for configuring applications on a user data-processing device by means of a token storing unique application identifying data, comprising the steps of:
a) establishing a communications connection between the token and the user data-processing device;
b) reading the unique application identifying data stored on the token to enable an agent to build and start a given application, each unique application identifying attribute being user-specific and being provided to call up at least one user-customized software comprising at least one of an application identified by the unique application identifying attribute and software components to form said application;
c) determining whether software comprising at least one of the application and software components to form the application identified by said unique application identifying attribute is available at the user data-processing device by means of the identifying data; and
d) loading the software components to allow the allocated application to be built and started when not available at the user data-processing device.

18. Method according to claim 17, wherein the token is a chip card.

19. Method according to claim 18, wherein the communications connection between the chip card and data-processing device is obtained via a card reader.

20. Method according to claim 19, wherein the agent is installed on one of the card reader and the data-processing device.

21. Method according to claim 19, wherein said establishing communications comprises the steps of:
a) determining of the chip card technology by the agent; and
b) loading by the agent of the requisite driver software to allow communications with the chip card.

22. Method according to claim 21, wherein the driver software is loaded as part of the agent.

23. Method according to claim 21, wherein the driver software is stored separately from the agent on the storage medium of the user data-processing device and is started by the agent.

24. Method according to claim 18 wherein the chip card has a non-volatile memory and further comprising storing the identifying data in a file in the non-volatile memory of the chip card.

25. Method according to claim 24 wherein said storing is conducted when the chip card is personalised.

26. Method according to claim 24 wherein said storing is conducted at the time of a first log-on to use an application.

27. Method according to claim 17, wherein said determining comprises the following further steps:
comparing the identifying data stored in the user data processing device to the identifying data transmitted by the chip card;
inserting identifying data with an application to identify a software comprising at least one of application and software components when an application is being stored on the user data-processing device; and
loading the software components and starting of the allocated application, by the agent, when the sets of identifying data match.

28. Method according to claim 27, further comprising the steps of:
establishing a connection to a second data-processing device by the agent by means of the identifying data when the identifying data do not match based on said comparing;
transferring the application found by means of the identifying data to the user data-processing system; and
adding the identifying data to the applications installed on the user data-processing device.

29. Method according to claim 28, wherein the identifying data includes address information in the form of a GUID.

30. Method according to claim 28 wherein the identifying data includes address information in the form of a URL.

31. A program storage device readable by machine, tangibly embodying a program of instructions executable by the machine to perform method steps for configuring applications on a user data-processing device by means of a token storing identifying data, said method comprising the steps of:
  a) establishing a communications connection between the token and the user data-processing device;
  b) reading the unique application identifying data stored on the token to enable an agent to build and start a given application, each unique application identifying attribute being user-specific and being provided to call up at least one user-customized software comprising at least one of an application identified by the unique application identifying attribute and software components to form said application;
  c) determining whether software comprising at least one of the application and software components to form the application identified by said unique application identifying attribute is available at the user data-processing device by means of the identifying data; and
  d) loading the software components to allow the allocated application to be built and started when not available at the user data-processing device.

\* \* \* \* \*